United States Patent
Khasnabish

(10) Patent No.: US 9,578,105 B2
(45) Date of Patent: Feb. 21, 2017

(54) DEVICE OPTIMIZED TRANSMISSION AND RECEPTION FOR MULTI-MODE, MULTI-MEDIA COMMUNICATIONS

(75) Inventor: Bhumip Khasnabish, Lexington, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 826 days.

(21) Appl. No.: 12/336,608

(22) Filed: Dec. 17, 2008

(65) Prior Publication Data

US 2010/0150021 A1    Jun. 17, 2010

(51) Int. Cl.
H04L 29/08    (2006.01)
H04L 12/58    (2006.01)
H04L 29/06    (2006.01)

(52) U.S. Cl.
CPC ........ *H04L 67/14* (2013.01); *H04L 12/5835* (2013.01); *H04L 51/066* (2013.01); *H04L 65/40* (2013.01)

(58) Field of Classification Search
None
See application file for complete search history.

(56) References Cited

U.S. PATENT DOCUMENTS

| | | | |
|---|---|---|---|
| 7,120,922 B2* | 10/2006 | Rodriguez et al. | 725/39 |
| 7,304,968 B2* | 12/2007 | Dawidowsky et al. | 370/331 |
| 7,424,032 B1* | 9/2008 | Sethuram et al. | 370/466 |
| 7,617,159 B1* | 11/2009 | Donner | 705/67 |
| 8,331,294 B2* | 12/2012 | MacInnis et al. | 370/329 |
| 2002/0001295 A1* | 1/2002 | Park | 370/338 |
| 2003/0033420 A1* | 2/2003 | Eyal et al. | 709/231 |
| 2003/0043765 A1* | 3/2003 | Dawidowsky et al. | 370/331 |
| 2004/0143669 A1* | 7/2004 | Zhao et al. | 709/228 |
| 2004/0151186 A1* | 8/2004 | Akama | 370/395.3 |
| 2004/0210657 A1* | 10/2004 | Narayanan et al. | 709/227 |
| 2005/0015495 A1* | 1/2005 | Florkey et al. | 709/227 |
| 2005/0281237 A1* | 12/2005 | Heinonen et al. | 370/338 |
| 2007/0010231 A1* | 1/2007 | Du | 455/405 |
| 2009/0094369 A1* | 4/2009 | Wooldridge et al. | 709/228 |
| 2009/0100349 A1* | 4/2009 | Hancock | 715/751 |
| 2009/0156176 A1* | 6/2009 | Hao et al. | 455/413 |
| 2010/0070641 A1* | 3/2010 | Allen | 709/230 |

* cited by examiner

Primary Examiner — Hicham Foud

(57) ABSTRACT

An approach is provided for receiving information from a plurality of communication services in a plurality of communication service formats and adjusting the information into another communication service format that is configured for receipt by a device and for communication to a user. A transmission session is established between a device and one of the plurality of communication services. Information from the one communication service is adjusted from a first communication service format into the another communication service format, seamlessly.

21 Claims, 8 Drawing Sheets

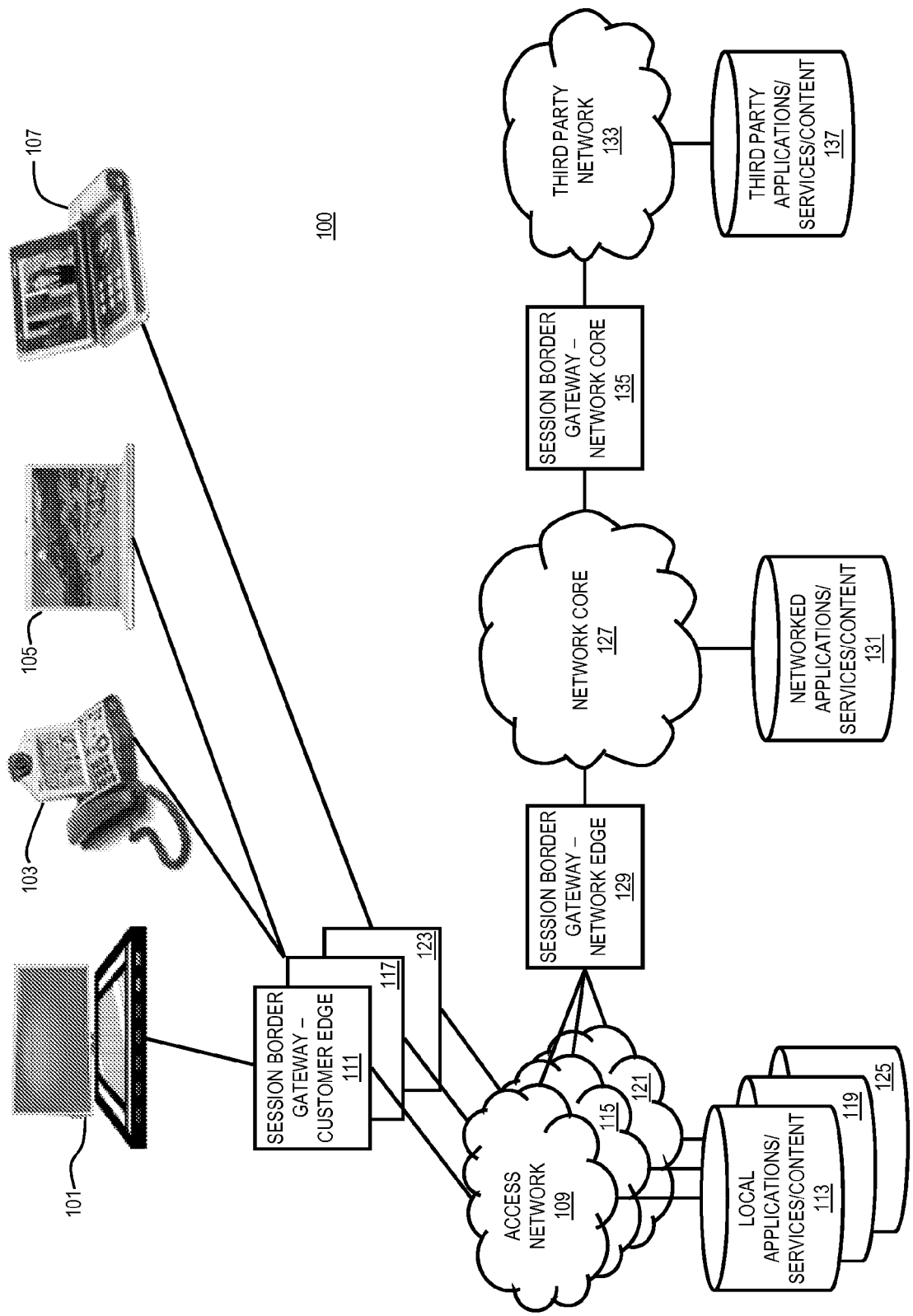

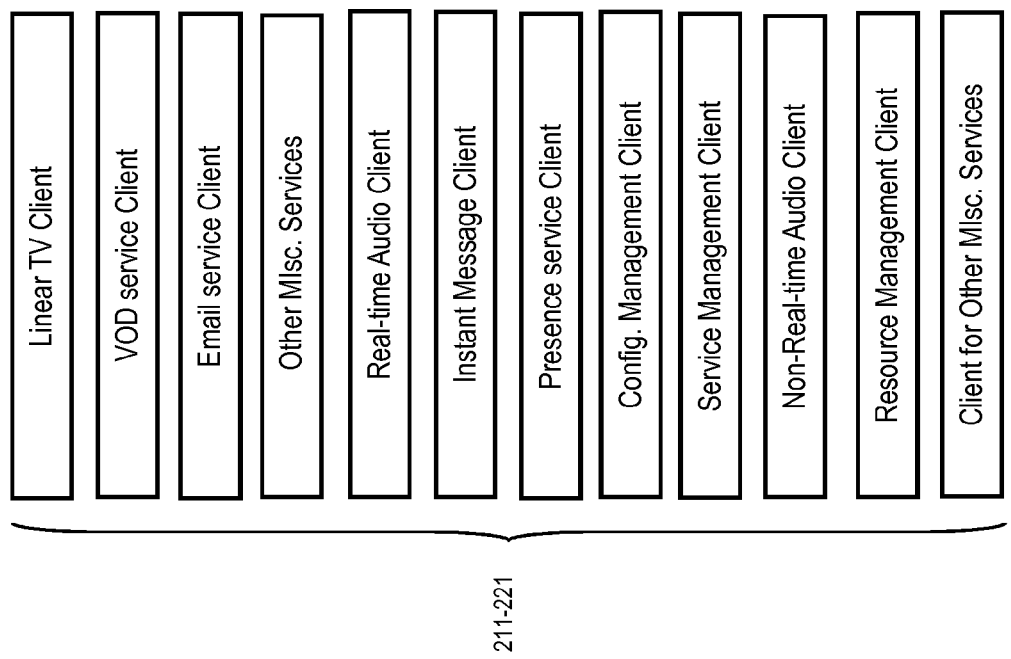

DEVICE OPTIMIZED TRANSMISSION AND RECEPTION FOR MULTI-MODE, MULTI-MEDIA COMMUNICATIONS

BACKGROUND INFORMATION

Modern technology has provided a broad variety of devices that can be used to access information including data, media, etc., and to allow communication between people using various means. For example, service providers provide streaming and on-demand video to customers that can be viewed on a television, personal computer (PC) or cellular phone. Also, service providers provide data and other media to customers that can be accessed using a personal computer or other similar device, and such devices may also allow users to communicate using Instant Messaging (IM), email, or Voice over Internet Protocol (VoIP) technologies. In addition to standard wired telephone services and VoIP services, users can communicate wirelessly using cellular telephones via cellular and/or wireless (e.g., Wi-Fi) service providers. As such, a user may end up owning numerous different devices in order to access and utilize each of these services from one or a plurality of service providers.

Therefore, there is a need to enable multiple devices to efficiently and conveniently access communication services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 1 is a diagram of a system providing devices that are each capable of accessing and utilizing services, according to an exemplary embodiment;

FIGS. 2A-2C are, respectively, a diagram of a customer device having an optimization module configured to allow the device to access and utilize different services of one or more service providers, a diagram of exemplary applications resident on the device, and a diagram of an exemplary protocol stack for the device, according to various embodiments;

DESCRIPTION OF THE PREFERRED EMBODIMENT

Figure 2A:
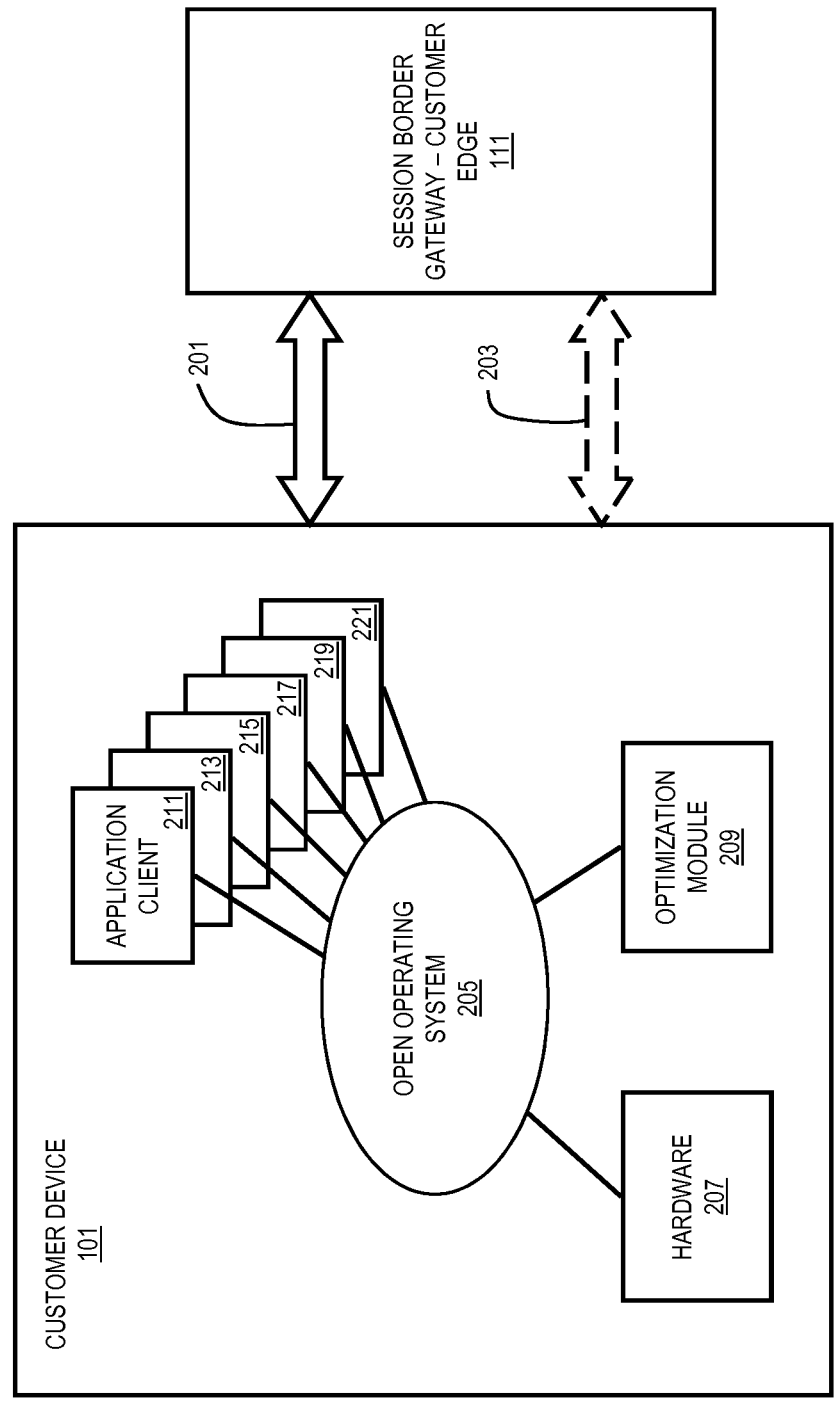

A preferred apparatus, method, and system for providing one or more devices each being capable of accessing and utilizing different services of one or more service providers are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

FIG. 1 is a diagram of a system 100 providing devices 101, 103, 105, and 107 that are each capable of accessing and utilizing different services, according to an exemplary embodiment. These services can be associated with a single domain or multiple domains; moreover, such domains can correspond to one or more service providers.

As depicted in FIG. 1, a user may have a television monitor (or display) 101 that accesses video, video-on-demand, or other services from a service provider, for example, via a set-top box, cable, digital subscriber line (DSL), and/or satellite. The customer may also have a telephone or videophone 103 that receives sound and/or video using Plain Old Telephone Service (POTS) or Voice over Internet Protocol (VoIP) service. The user (customer or subscriber) may also have a desktop or laptop computer 105 that receives data, video, sound, or other information via an Internet access service via telephone lines, cellular connection, DSL, satellite connection, Wi-Fi, and/or cable lines. Also, the customer may have a cellular telephone 107 that receives data, video, sound, or other information via a cellular or Wi-Fi service. Traditionally these different devices are used for different forms and modes of communications that are accessed using different services. However, the system 100 depicted in FIG. 1 allows each of the devices 101, 103, 105, and 107 to access and utilize the services of the other devices, thus providing flexibility in the manner in which the various services are used.

In FIG. 1, the television monitor 101 is in communication with an access network 109 via a session border gateway at a customer edge 111. The access network 109 is in communication with a database providing local applications, services, and content 113. Similarly, the telephone 103 and laptop computer 105 are in communication with an access network 115 via a session border gateway at a customer edge 117, and the access network 115 is in communication with a database providing local applications, services, and content 119. Furthermore, the cellular telephone 107 communicates with an access network 121 via a session border gateway at a customer edge 123, and the access network 121 is in communication with a database providing local applications, services, and content 125. The access networks 109, 115, and 121 are in communication with a network core 127 via a session border gateway at a network edge 129, and the network core 127 is in communication with a database providing networked applications, services, and content 131. The network core 127 has connectivity to one (or more) third party network 133 via a session border gateway at a network core edge 135, and the third party network core 133 utilizes a database providing third party applications, services, and content 137.

Figure 3:
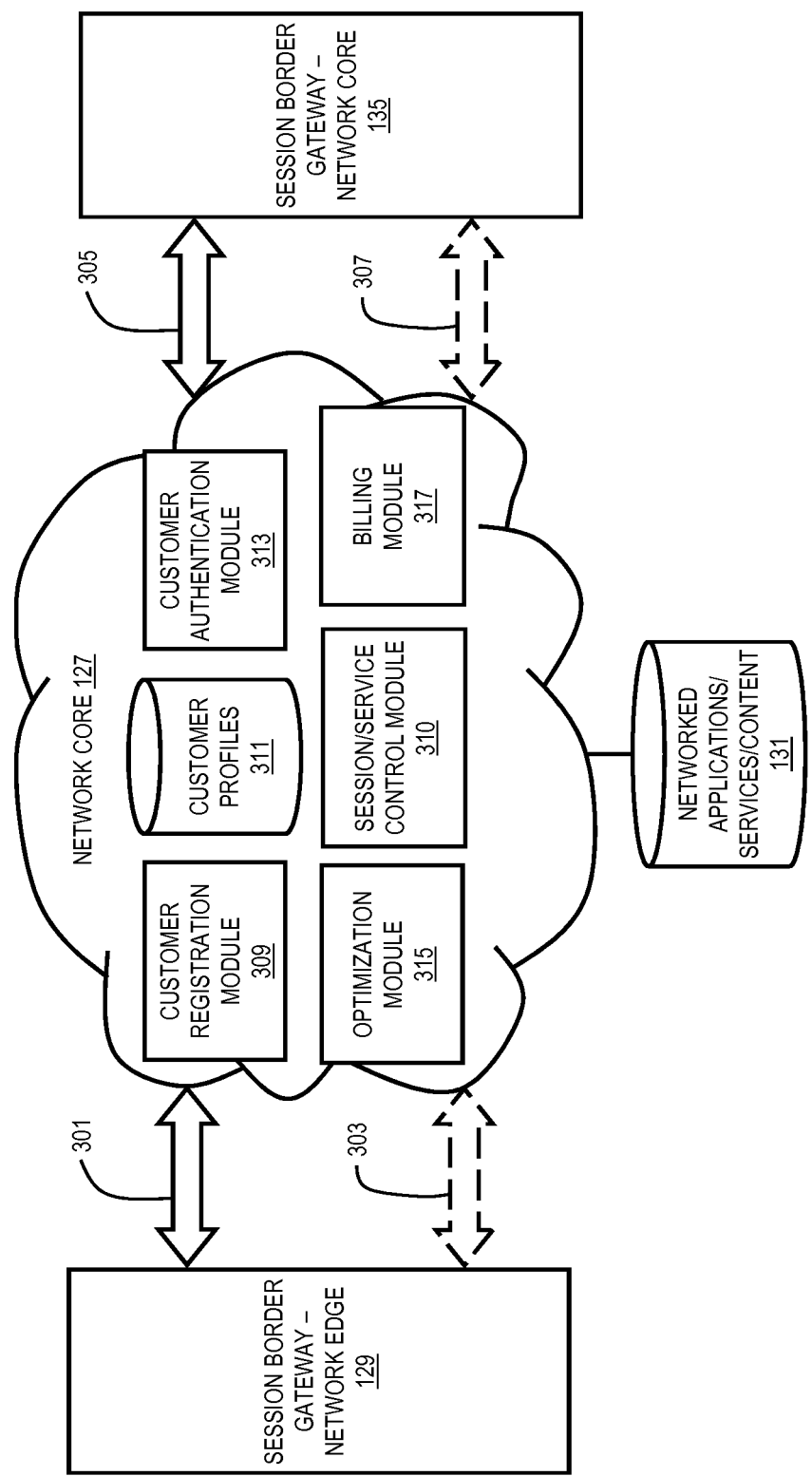
FIG. 3 is a diagram of a network core having an optimization module configured to allow one or more customer devices to access and utilize different services of one or more service providers, according to an exemplary embodiment.

The system 100 includes an optimization module in a customer device that is configured to allow the device to access and utilize different services of one or more service providers, as depicted in FIG. 2, or in a network core that is configured to allow one or more customer devices to access and utilize different services of one or more service providers, as depicted in FIG. 3. Alternatively, the optimization module can be provided in the access network(s) or at some other location along the communication path between the information provider and the customer device. The optimization module allows the customer device(s) to send and receive information not only from the service provider to which the customer devices is originally intended, but also from any other service provider to which the user has access. Thus, for example, if a user has the ability to send and receive instant messaging (IM) communications using an internet access account, which would typically be accessible via a computer, the optimization module would allow the user to utilize the IM communications via the internet access account using the user's television, cellular telephone, etc.

Thus, the system 100 can allow a user to pickup a telephone call using a television, personal computer, etc. The system 100 will allow for the establishment of an information transmission session, and the session will adapt to whatever customer device is being used to allow the communication. The user can even switch devices during the session, and the session will adapt real-time. Either the device or the network will adapt the session to the device so that the user will perceive no difference, thus providing seamless continuity of the session in a device independent manner. The system 100 uses adjunct customer device(s) or provides capabilities (e.g., using middleware), or provides network-based mechanisms to provide communication service (transmission and reception) in a device-optimized fashion so that the user of a device can seamlessly get a multitude of services using the same device. This arrangement helps to minimize the number of terminals and interfaces one needs today for communications services at home or at work or while mobile. Product companies can utilize client-cluster based devices irrespective of whether it is used for voice, data, wireless or video communications. Service companies can utilize the signaling and media anchoring options for delivering sessions seamlessly to a multitude of devices based on user's demand, preference, proximity, etc.

FIGS. 2A-2C are, respectively, a diagram of a customer device having an optimization module configured to allow the device to access and utilize different services of one or more service providers, a diagram of exemplary applications resident on the device, and a diagram of an exemplary protocol stack for the device, according to various embodiments. As seen in FIG. 2A, a customer device 101 communicates with a session border gateway at the customer edge 111 via either a wired communication line 201 or a wireless communication 203 to transmit the information payload (e.g., media, voice, video, data, etc.), management and configuration information, and signaling and control information between the device and the network. The customer device 101 in this embodiment includes an open operating system 205, hardware 207 (e.g., graphics, digital signal processor, video, audio, etc.), an optimization module 209, and a plurality of application clients 211, 213, 215, 217, 219, and 221. In an exemplary embodiment, different instances (e.g., light-weight, heavy-weight, etc.) of the client can run on different physical devices in possession of the same customer. The various application clients can be used by the customer device 101 to process information for a wide variety of different features that the customer device might not otherwise be configured to handle. For example, the application clients, shown in FIG. 2B, can include a linear television client (typical function of such a television/set-top box customer device), a video-on-demand client (also typical function of such a television/set-top box customer device), an email service client, real-time audio client, instant messaging client, presence service client, configuration management client, service management client, non-real-time audio client, and/or other miscellaneous services.

As shown in FIG. 2C, the device 101 employs a session layer 251 that provides for such functions as a constant-rate input to the applications (i.e., cross-layer adaptive session). Transport layer 253 utilizes, e.g., a cross-layer adaptive Transmission Control Protocol/User Datagram Protocol (TCP/UDP) layer, with application-specific buffers and processing for adaptively streaming packets to and from the adjacent protocol layers. By way of example, the device 101 can also utilize an IP and logical link layer 255; such layer 255 can be either active or ready-to-be active state depending on the feedback of the lower and upper layers. At the physical layer 257, the device 101 can adaptively turn ON or OFF (i.e., active state or inactive state) based on the upper layers' receptively and processing capability.

FIG. 3 is a diagram of a network core 127 that is in communication with the session border gateway at the network edge 129 via either a wired communication line 301 or a wireless communication 303, and the network core 127 is in communication with the session border gateway at the network core edge 135 via either a wired communication line 305 or a wireless communication 307. The network core 127 in this embodiment includes a customer registration module 309, a session/service control module 310, a customer profile database 311, a customer authentication module 313, an optimization module 315, a billing module 317, and the networked applications/services/content database 131. As will be described in detail below, the customer registration module 309 is used to register a user and determine the desired service control settings for the user and the user's customer device(s), which are then stored in the customer profile database 311. The session/service control module 310 provides functions associated with managing communication sessions in accordance with the users' profiles. The customer authentication module 313 is used to authenticate the user and customer device in order to allow access to the system and the optimization module 315. And, the billing module 317 is used to compile and distribute billing information for transmission sessions.

Figure 4:
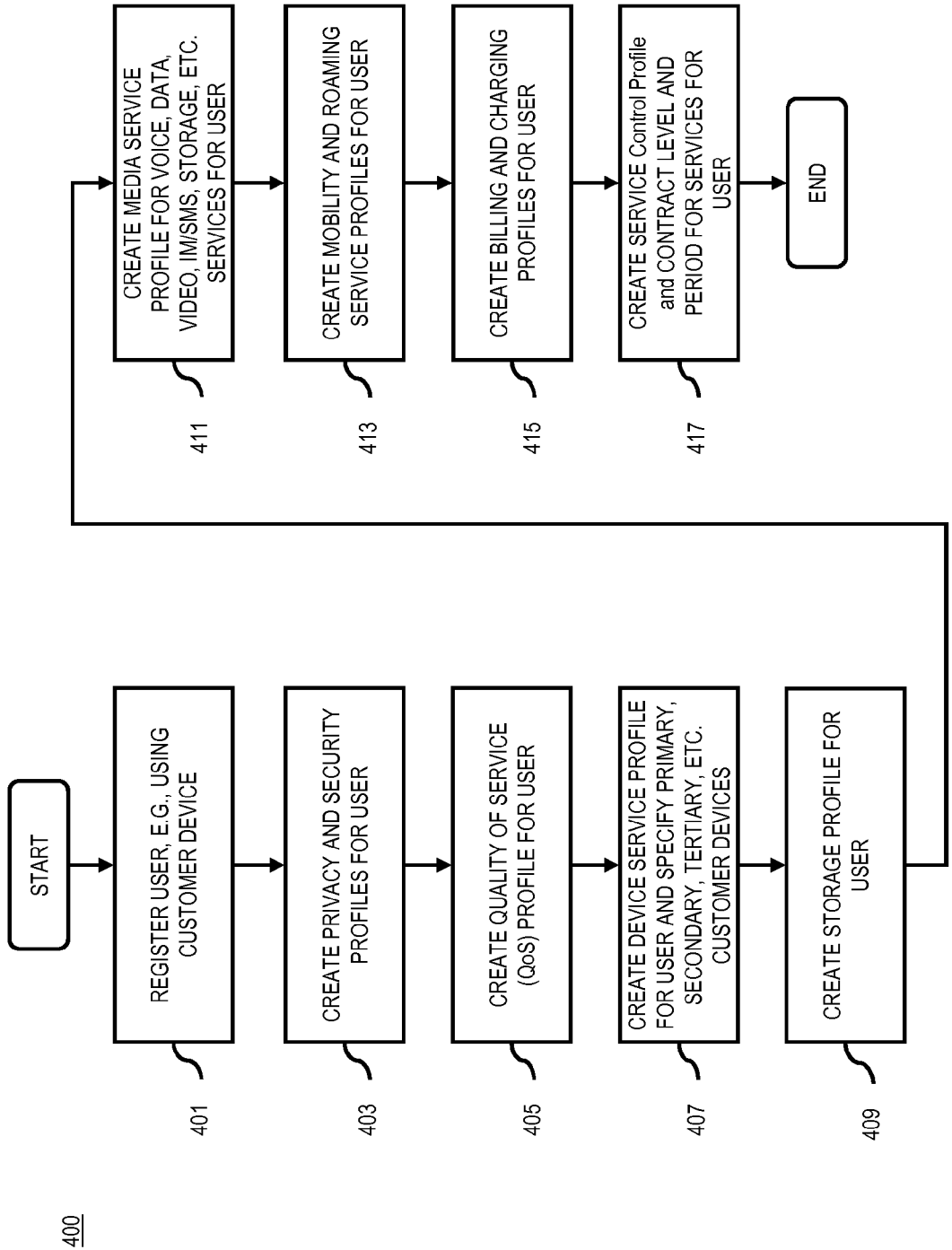
FIG. 4 is a flowchart of a process for registering a user to use the system and setting up profiles for the user service and control, according to an exemplary embodiment.

FIG. 4 is a flowchart of a process 400 for registering a user to use the system and setting up profiles for the user service and control, according to an exemplary embodiment. In step 401, the user begins the registration process, for example, using a customer device (e.g., telephone keypad, television remote control, computer via web using E.164 address (telephone number), IP address, URI/L, etc.) by contacting the customer registration module 309. In step 403, the user creates privacy and security profiles for media and signaling services used by the user, which are then stored in the customer profile database 311. The user can create quality of service (QoS) profiles for media and signaling services used by the user in step 405. The user can create device service profiles and specify primary, secondary, tertiary, etc. devices for certain time periods (e.g., primary device is set as IMs on television between 9 pm and 11 pm) in step 407. In step 409, the user can create storage profiles for the various services. In step 411, the user can create media service profiles for voice, data, video, IM/SMS, storage, etc. services. The user can also create mobility and roaming service profiles in step 413. In step 415, the user can also create various billing and charging profiles for the services the user uses. And, in step 417, the user can create service contact levels/periods for the services. Thus, the user can have control over the set-up and operation of the system. It is noted that the system can be provided with default, demographic, and/or geographic settings for the profiles if the user opts out of setting up certain segments of the profiles. Once the registration process is completed by the user, the user will be able to utilize the system, and can modify the profiles at a later date if so desired (e.g., if services are changed, added, or canceled, or if customer devices are changed, added, or deleted).

Figure 5:
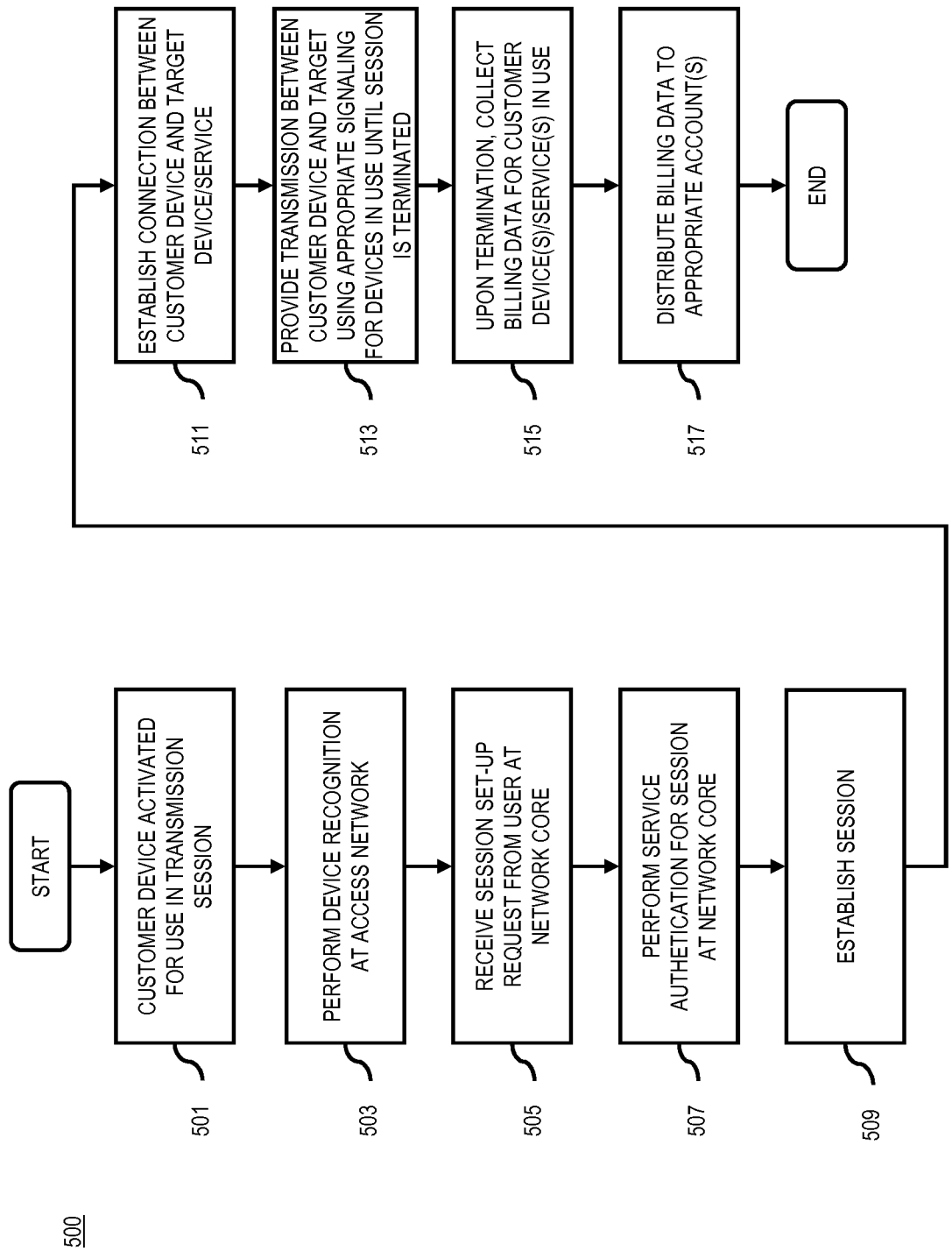
FIG. 5 is a flowchart of a process for using a customer device to run a transmission session and bill for services used during the transmission session, according to an exemplary embodiment.

FIG. 5 is a flowchart of a process 500 for using a customer device to run a transmission session and bill for services used during the transmission session, according to an exemplary embodiment. In step 501, a customer device is activated for use in a transmission session. The access network for that device performs a device recognition procedure in step 503. In step 505, a session set-up request from the user is received by the network core, which could indicate the customer device being used, as well as a target device that the user is attempting to contact or a target service that the user is attempting to utilize. In step 507, the customer authentication module 313 performs a service authentication to determine whether the user and/or customer device is authorized to utilize the system. If the user and customer device are authenticated, then the transmission session is established in step 509; and in step 511 a connection is established between the customer device and the target device or service. Then, in step 513, transmission of information is provided between the customer device and the target device/service using appropriate signaling for the devices in use until the session is terminated. In step 515, upon termination of the session, billing data is collected for each customer device and/or service(s) used during the session, which can be prorated based on overall usage. And, then in step 517, the billing data is distributed to the appropriate account(s) so that changes to the user can be collected and billed to the user on a periodic basis.

Figure 6:
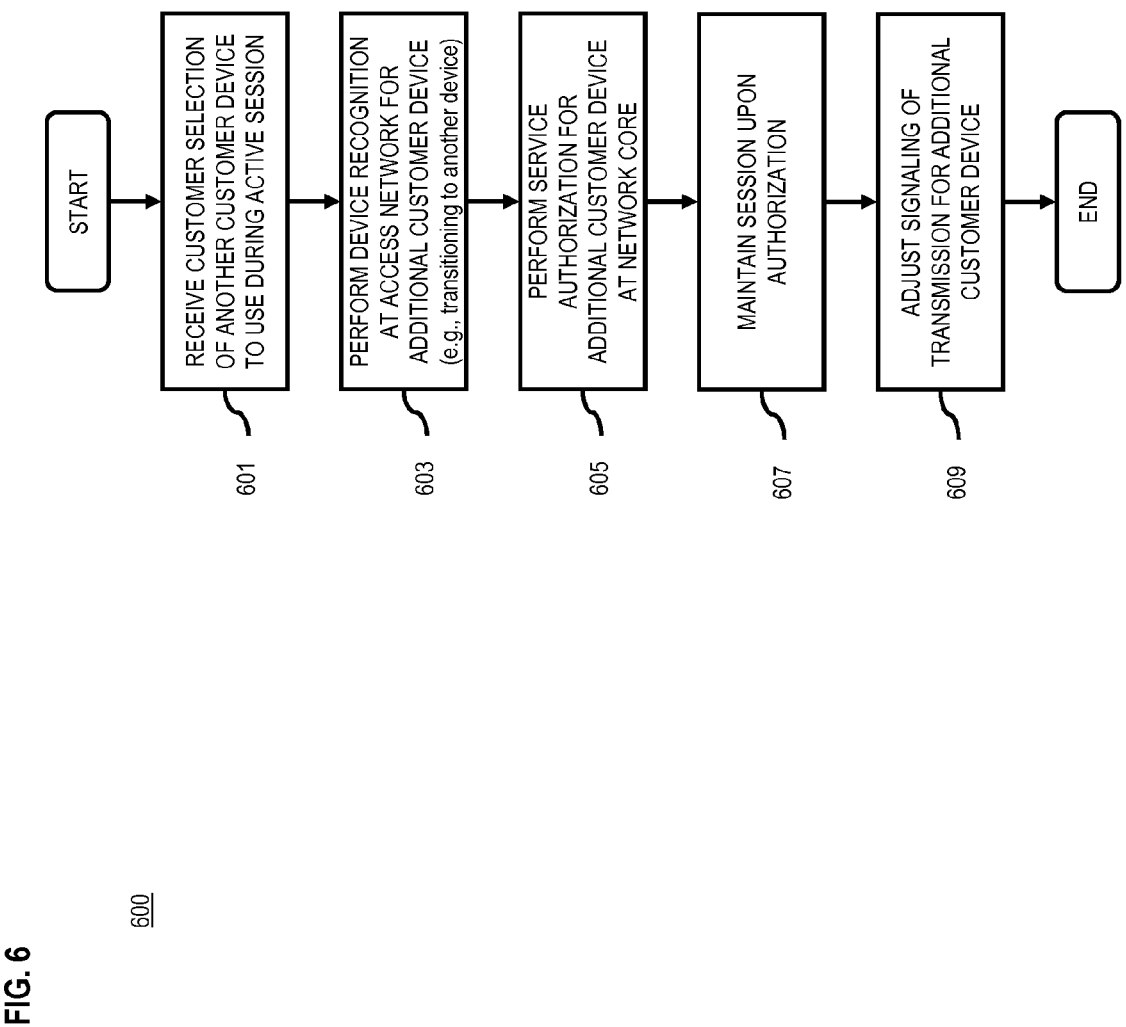
FIG. 6 is a flowchart of a process for changing a selection of customer device being used during an ongoing transmission session, according to an exemplary embodiment.

FIG. 6 is a flowchart of a process 600 for changing a selection of customer device being used during an ongoing transmission session, according to an exemplary embodiment. In step 601, during an ongoing, active transmission session, the user selects the use of another customer device, for example, by activating or turning on another device, and the system receives a signal indicating this new activation/selection. In step 603, the access network corresponding to the additional customer device performs device recognition, and in step 605 the network core performs service authorization for the use of the additional customer device. Upon positive completion of the recognition and authorization/authentication, the active information session is maintained in step 607. In step 609, the signaling of the transmission is adjusted to correspond to the appropriate signaling for the additional customer device, and thus the additional customer device will seamlessly be joined into the active information session.

The system through the use of the optimization module 315 is configured to anchor signaling for all registered endpoints through the (logically) nearest session border gateway (SBG-XX), and allocates the logical port in SBG-XX to which the state or status of the active port is fed. The optimization module 315 keeps dormant information/media for all registered endpoints through the (logically) nearest SBG-XX, and allocates logical port in SBG-XX to which the state or status of the active port is fed. The module periodically scans for the customer device being used for the service using an adjustable interval (default and pre-programmed options are supported). The optimization module 315 delivers signaling and media to the user-selected/chosen active device. The optimization module 315 performs adjustment of the format of the information, for example, signaling, media, control, etc. to suit the device being used.

The system 100 through the use of the optimization module 315 uses signaling to/from, device (preference and registration) ID, media access control (MAC) ID, etc. to identify the device in-use and going to be used. The optimization module 315 adjusts signals, media, etc., to suit the device (wired phone, television, laptop computer, mobile phone, etc.) in-use as well as devices that will be used. The SBG-XX supports signaling translation and adaptation function (STAF), media translation and adaptation function (MTAF), protocol translation and adaptation function (PTAF), encapsulation translation and adaptation function (ETAF), and command (for management) translation and adaptation function (CTAF). Such features and functions can be provided by one or more SBG-XX. The system 100 provides service continuity that is maintained seamlessly.

Thus, to reiterate the process set forth in FIG. 5 in greater detail, the process begins when the user turns on the customer device that the user wants to use for a voice session, for example. The device, for example the telephone 103, is recognized by the corresponding access network 115 through session border gateway at a customer edge (SBG-CE) 117, and gets authorized via a live and stored local applications/services/content database (LAS-ASC) 119 for an information session based voice service. The user enters the address (IP, URI/L, E.164 number, etc.) of the target user (device preference may or may not exist), and the user "sends" the session setup request (priority and security of the session may or may not be requested at the time of sending the setup request). The target device and resource availability based response comes from the network allowing a session for voice service or other types of session with other recommended device Assuming that a session for voice service is thereby established, a signaling state of the session is kept active in two (to and from) SBG-XX and LAS-ASC, and kept dormant in other SBG-XXs and LAS-ASCs. A real-time transport protocol (RTP) ping is exchanged between the calling customer device and the target device(s) to determine fastest (logical) media exchange path between the communicating devices. The media state of the session is kept active in two (to and from) SBG-XX and LAS-ASC, and kept dormant in other SBG-XXs and LAS-ASCs. If the user moves or selects another device for the same session, which is discussed with respect to FIG. 6, SBG-XXs and LAS-ASCs recognize and authorize the newly paired devices, the signaling and media anchors points enter active state from the dormant state, and the former (old) signaling and media anchors points enter dormant state. Thus, the user moves to continue the session with the other paired devices, and the media transmission over the session continues. When the calling customer device(s) terminates the session or the target (called) device terminates the session, then billing data is collected and distributed among all the SBG-XXs and LAS-ASCs traversed during the entire session, and all the states are released and cleared from all the networked and hosted elements or entities.

A similar process can be performed for a streaming video session, etc.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
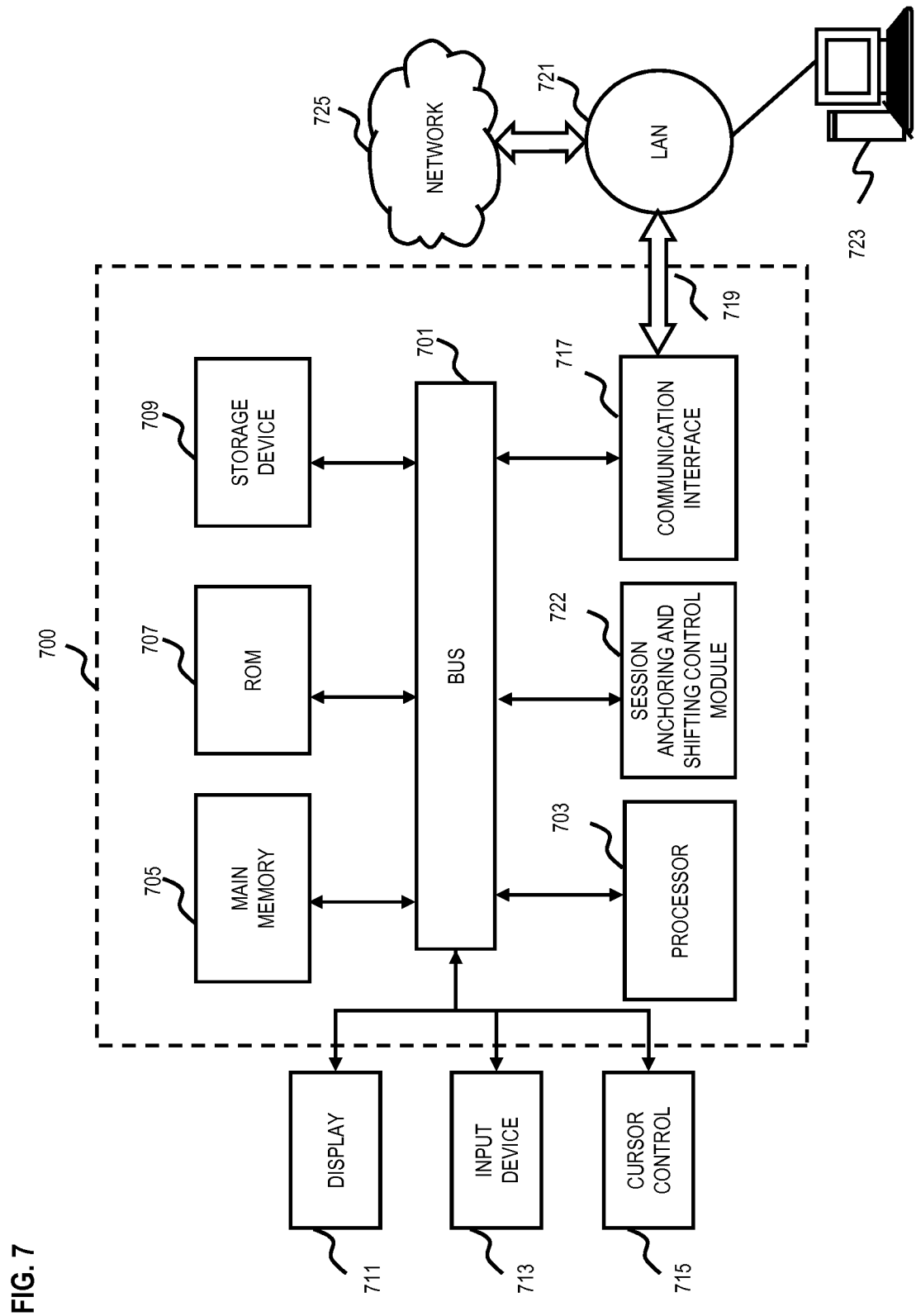
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the described processes. Thus, these embodiments are not limited to any specific combination of hardware circuitry and software.

The computer system 700 also includes a communication interface 717 coupled to bus 701. Additionally, a session anchoring and shifting control module 722 provides anchor features (as described previously) to support seamless delivery of sessions across various devices.

The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   initiating a communication session between a user device and a target device for utilizing a network communication service via the target device or in communicating with the target device, wherein the communication session is initiated via a core network;
   utilizing, by the user device, the network communication service via the communication session, wherein the communication session is controlled based on one or more user profiles reflecting one or more service protocols of the user device, service protocols of the network communication service and one or more attributes for the communication session, wherein the one or more user profiles are stored in the core network remote from any user device; and
   adapting transmission signaling of the communication session to be compatible with at least one of the service protocols of the user device and with the service protocols of the network communication service, and to facilitate the communication session and the utilization by the user device of the network communication service,
   wherein the stored one or more user profiles include a registered user, each user device of the registered user that can be used during the communication session regardless of whether or not said each user device of the registered user is currently participating in the communication session, and the desired service control settings for the registered user and for said each user device of the registered user that can be used during the communication session including a device service profile specifying a certain time period that said each user device can be used.

2. The method of claim 1, further comprising:
   authenticating the user device for use during the communication session before establishing the transmission session.

3. The method of claim 1, further comprising:
   initiating use of an alternate device to access the network communication service via the communication session; and
   adapting the transmission signaling of the communication session to be compatible with at least one of one or more service protocols of the alternate device, and to facilitate access by the alternate device to the communication session and utilization by the alternate device of the network communication service, without terminating the communication session.

4. The method of claim 3, further comprising:
   authenticating the alternate device for use during the communication session before adding the alternate device to the communication session,
   wherein authenticating the alternate device is based on said each user device of the registered user that can be used during the communication session included with the stored one or more user profiles and requires no discovery of the alternate device by the user device conducting the communication session with the target device.

5. The method of claim 1, further comprising:
   collecting billing data for one or more of use of the communication session, the user device, and the network communication service, during the communication session.

6. The method of claim 1, further comprising:
   adapting the transmission signaling of the user device during the communication session from a communication service format of the user device into a communication service format that is configured for receipt by the network communication service.

7. The method of claim 1, further comprising:
   executing an application client associated with the user device to provide a plurality of features associated with the network communication service.

8. An apparatus comprising:
   at least one processor; and
   at least one memory including computer program code for one or more programs,
   the at least one memory and the computer program code configured to, with the at least one processor, cause the apparatus to perform at least the following,
       establish a communication session between a user device and a target device for utilizing a network communication service, wherein the communication session is initiated via a core network,
       utilize, by the user device, the network communication service via the communication session, wherein the communication session is controlled based on one or more user profiles reflecting one or more service protocols of the user device, service protocols of the network communication service and one or more attributes for the communication session, wherein the one or more user profiles are stored in the core network remote from any user device,
       adapt transmission signaling of the communication session to be compatible with at least one of the service protocols of the user device and with the service protocols of the network communication service, and to facilitate the communication session and the utilization by the user device of the network communication service,
       wherein the stored one or more user profiles include a registered user, each user device of the registered user that can be used during the communication session regardless of whether or not said each user device of the registered user is currently participating in the communication session, and the desired service control settings for the registered user and for said each user device of the registered user that can be used during the communication session including a device service profile specifying a certain time period that said each user device can be used.

9. The apparatus of claim 8, wherein the at least one memory resides in the user device.

10. The apparatus of claim 8, wherein the at least one memory resides in a network element of a network via which the communication session is established.

11. The apparatus of claim 8, wherein the apparatus is further caused to:

adapt the transmission signaling of the communication session to be compatible with one or more service protocols of one or more alternate devices, and to facilitate access by the alternate devices to the communication session and utilization by the alternate devices of the network communication service.

12. The apparatus of claim 8, wherein an alternate device initiates access to the network communication service via the communication session, and the apparatus is further caused to:
adapt the transmission signaling of the communication session to be compatible with at least one of one or more service protocols of the alternate device, and to facilitate access by the alternate device to the communication session and utilization by the alternate device of the network communication service, without terminating the communication session.

13. The apparatus of claim 12,
wherein the alternate device is authenticated for use during the communication session before adding the alternate device to the communication session, and
wherein authenticating the alternate device is based on said each user device of the registered user that can be used during the communication session included with the stored one or more user profiles and requires no discovery of the alternate device by the user device conducting the communication session with the target device.

14. The apparatus of claim 8, wherein the apparatus is further caused to execute an application client associated with the user device to provide a plurality of features associated with the network communication service.

15. A system comprising:
a user device circuitry configured to access one or more network communication services via communication sessions of an access network, and to utilize the network communication services via the communication sessions, wherein the communication sessions are controlled based on one or more user profiles reflecting one or more service protocols of the user device, service protocols of the network communication services and one or more attributes for the communication sessions, wherein the one or more user profiles are stored in a core network remote from any user device;
a processor configured to establish a communication session between the user device and a target device for utilizing a one of the network communication services, and to adapt transmission signaling of the one communication session to be compatible with at least one of the service protocols of the user device and with the service protocols of the one network communication service, and to facilitate the one communication session and the utilization by the user device of the one network communication service,
wherein the communication session is established via the core network, and
wherein the stored one or more user profiles include a registered user, each user device of the registered user that can be used during the communication session regardless of whether or not said each user device of the registered user is currently participating in the communication session, and the desired service control settings for the registered user and for said each user device of the registered user that can be used during the communication session including a device service profile specifying a certain time period that said each user device can be used.

16. The system of claim 15, further comprising:
an authentication circuitry configured to authenticate the user device for use during the one communication session before establishing the one communication session.

17. The system of claim 15, further comprising:
a billing circuitry configured to collect billing data for one or more of use of the one communication session, the user device, and the one communication service.

18. The system of claim 15, wherein the processor resides in the user device.

19. The system of claim 15, wherein the processor is provided in a remote network element of a network via which the user device accesses the one or more network communication services.

20. The system of claim 15, wherein the processor is further configured to:
adapt the transmission signaling of the one communication session to be compatible with one or more service protocols of one or more alternate devices,
facilitate access by the alternate devices to the communication session and utilization by the alternate devices of the one network communication service, and
authenticate the one or more alternate devices for use during the communication session before adding the one or more alternate devices to the communication session,
wherein authenticating the alternate device is based on said each user device of the registered user that can be used during the communication session included with the stored one or more user profiles and requires no discovery of the one or more alternate devices by the user device conducting the communication session with the target device.

21. The system of claim 15, wherein an alternate device initiates access to the one network communication service via the one communication session, and the processor is further configured to adapt the transmission signaling of the communication session to be compatible with at least one of one or more service protocols of the alternate device, and to facilitate access by the alternate device to the one communication session and utilization by the alternate device of the one network communication service, without terminating the one communication session.

* * * * *